United States Patent

[11] 3,624,829

| [72] | Inventor | Richard F. Crone |
| | | 2101 Beach St., San Francisco, Calif. 94123 |
| [21] | Appl. No. | 774,238 |
| [22] | Filed | Nov. 8, 1968 |
| [45] | Patented | Nov. 30, 1971 |

[54] REFLEX CAMERA APPARATUS
6 Claims, 2 Drawing Figs.

[52] U.S. Cl. ................................................. 95/42, 95/11 V
[51] Int. Cl. ............................................. G03b 19/12
[50] Field of Search .......................................... 95/42, 11

[56] References Cited
UNITED STATES PATENTS

| 2,401,530 | 6/1946 | Vought | 95/11 X |
| 2,372,430 | 3/1945 | Kals | 95/42 |
| 3,368,863 | 2/1968 | Mueller | 352/141 |
| 3,468,233 | 9/1969 | Schmidt | 95/42 |

*Primary Examiner*—Samuel S. Matthews
*Assistant Examiner*—Richard L. Moses
*Attorney*—Lowhurst and Hamlick ABSTRACT: A single lens reflex camera apparatus having a continuously observable view-finding feature. An apertured mirror is provided between the entrance aperture and shutter of a camera with the mirror aperture positioned along the optical axis of the camera, so that the film-exposing light passes therethrough and the remaining light passing into the camera is reflected onto the view-finder.

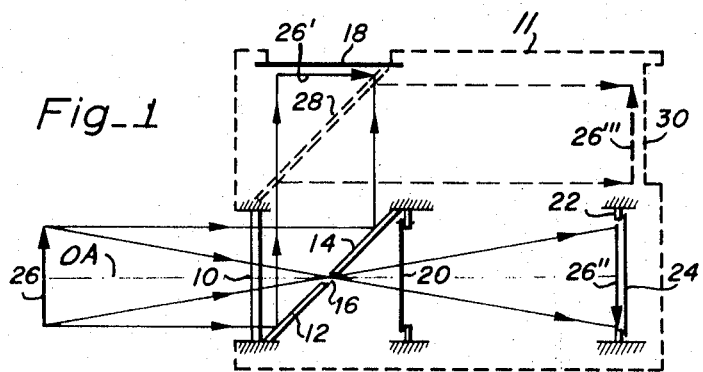
Fig_1
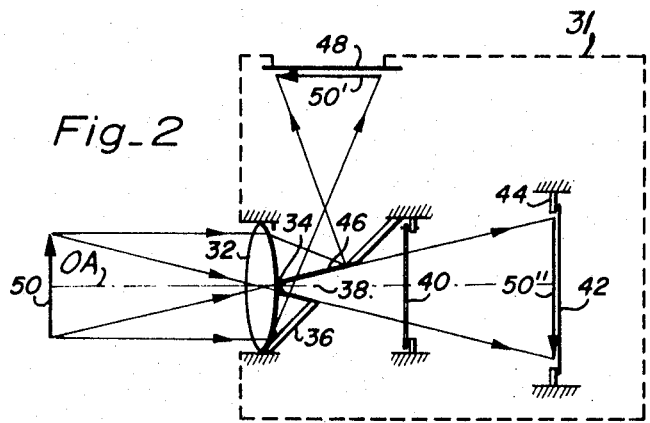
Fig_2
INVENTOR
RICHARD F. CRONE
BY
ATTORNEY

REFLEX CAMERA APPARATUS

BACKGROUND OF THE INVENTION

It has been common practice in the photographic industry for many years now to provide cameras with optical view-finder systems which enable the operator of the camera to view the subject at some time prior to exposing film. In the prior art single-lens reflex camera, for example, a fully reflecting mirror is typically mounted for movement between two positions, the first position being one wherein the mirror intersects the optical axis of the picture-taking system behind the objective lens, and the second position being one wherein the mirror is swung out of the way of the picture-taking system.

In the first mirror position, the view-finder system sees the same image produced by the camera objective lens. However, before the shutter is tripped to expose the film, the reflex mirror pivots out of the way into its second position. Hence, the subject being photographed cannot be continuously observed through the view-finder during the actual picture-taking operation. The mirror is thereafter restored to its first position before the next picture is taken, so that the subject again can be viewed. This system is usually quite complex and has certain mechanical difficulties which accompany the mechanism for inserting and removing the mirror from the optical path between the lens system and the film to be exposed.

In another prior art attempt to provide a continuous operable view-finding mechanism for a simple box-type camera, disclosed in U.S. Pat. No. 2,372,430, a partially silvered or pellicle mirror was placed in-between the lens system and the photographic film, and was disposed at an angle of approximately 45°, relative to the optical path between the lens and the film, so as to reflect a portion of the light passing through the lens system onto a ground glass-viewing screen typically positioned at the top or side of the camera. This system, also, suffered from several disadvantages, the most important of which was the fact that the partially silvered reflecting means caused the light passing from the lens to the film to be diffused and prevented a sharp image from being focused onto the film.

SUMMARY OF THE PREFERRED EMBODIMENTS

The present invention relates generally to optical view-finder systems for cameras and, more particularly, to an improved view-finding apparatus for cameras wherein the subject being photographed can be continuously observed through the view-finder system without causing distortion of the image transmitted to the film during exposure.

Most modern cameras have a field-stop aperture which defines the dimensional area of the film to be exposed when the shutter is opened and include an aperture stop positioned between the lens and the field-stop, usually closely adjacent to the lens. Thus, a frustoconical portion of what I choose to term an "exposure cone" is dimensionally defined at one end by the aperture stop, and at the other end by the largest diagonal opening of the field-stop. Since in most simple cameras the aperture stop is f/11 or less, the diameter of which is typically less than the diameter of the lens means, it is evident that a large portion of the light which passes through the lens is not allowed to reach the field-stop aperture. Thus, a large portion of the light passing through the lens means is not utilized to expose the film.

Where the above is the case, it is possible, by the use of an apertured reflection means, to use the light passing through the lens but falling outside the exposure cone to provide a continuous reflex-type view-finder without interfering with the exposure characteristics of the camera. This is accomplished by positioning an apertured mirror between the aperture-stop and the field-stop and inclining the mirror at an angle which will reflect the incident light onto a ground glass view-finder window or the like. Since the dimensions of the mirror aperture are defined by the surface of the exposure cone at a given position along its axis, it is desirable that the mirror be positioned as close to the aperture-stop as possible, in order that maximum mirror surface be made available to reflect light to the view-finder.

It is, therefore, a principal object of the present invention to provide a modified single lens reflex camera apparatus, which is both simple in construction and inexpensive to manufacture.

Another object of the present invention is to provide a single lens reflex camera using an apertured mirror disposed between the aperture-stop and the field-stop for providing an image upon a view-finder window substantially identical to that of which the film is to be exposed.

While the features of novelty characterizing the present invention are pointed out with particularity in the claims annexed to and forming a part of this specification, the invention itself, together with other objects and advantages thereof, will perhaps best be understood by referring to the following detailed description of the preferred embodiments illustrated in the accompanying drawing.

IN THE DRAWING

FIG. 1 is a schematic diagram of a simple pin-hole camera modified in accordance with the present invention.

FIG. 2 is a schematic diagram of a more complex camera modified in accordance with the present invention.

DESCRIPTION OF THE PREFERRED EMBODIMENTS

Referring now to the drawing, there is shown in FIG. 1 a schematic diagram of a simple pin-hole type camera which has been modified to include a view-finding innovation in accordance with the present invention. In this embodiment the camera includes a window 10, which has no optical-focusing properties, and which serves mainly as a dust shield for preventing dust from entering the camera housing indicated schematically by the dashed lines 11. Positioned behind the window 10 and preferably as close thereto as possible, is a mirror 12, having a reflective side 14 and a small aperture 16 which forms a fixed aperture stop and allows light to pass therethrough.

The mirror 12 is inclined at an angle of 45° relative to the window 10 so that the majority of the light passing through the window 10 will be reflected onto a ground glass view-finder plate 18 positioned at the top of the camera enclosure and arranged so as to display an image substantially identical to that which will be projected onto the film during exposure. Positioned behind the mirror 12 is a shutter means 20 which prevents light passing through the window 10 from reaching the field-stop aperture 22 and a film-strip 24 positioned immediately therebehind. In the illustrated embodiment, the structure 22, defining the field-stop aperture, serves as a means for positioning the filmstrip 24 at an appropriate position along the optical axis OA of the camera.

In operation, the shutter means 20 is normally closed and the front side of the camera, including the window 10, is pointed in the direction of the object 26 to be photographed. Light rays emanating from this object 26 will pass through the window 10 and be reflected by the mirror 12 onto the ground glass view-finder 18 to produce thereon an image 26'. Once the selected object 26 is located and composed in the view-finder 18 as shown at 26', the operator trips the shutter 20 to allow light rays passing from the object 26 through the pin-hole 16 in the mirror 12 to expose the film 24 with the object as shown at 26''. The shutter speed is typically preselected so as to allow the film 24 to be exposed for the proper interval of time as dictated by the ambient light conditions.

Since the window 10 and mirror 12 have no focusing properties in this instance, it will be apparent that the image 26', which is reflected onto the ground glass view-finder plate 18, will be inverted when viewed from an observer standing behind the camera. It may therefore be desirable in the alternative to provide a second mirror 28 positioned parallel to the mirror 12 as shown by the dash lines 28 in the drawing. In such case, the erect image 26''' is reflected onto the repositioned view-finder plate 30.

Referring now to FIG. 2 of the drawing, there is illustrated a more complex camera apparatus which includes a lens means 32 forming a light entrance window having the additional capability of focusing the incoming light rays into the camera housing 31. Positioned immediately behind the lens 32 is an aperture stop means 34 which limits the amount of film-exposing light which is allowed to enter the exposure path of the camera. Disposed immediately behind the lens 32 and aperture stop 34, and as close thereto as possible, is a mirrored-reflecting means 36 which is positioned at an angle of 45° relative to the plane of the lens means 32. The reflecting means 36 includes an aperture 38 which may be an actual hole in the mirror or may be merely an unsilvered portion. A shutter means 40 is provided as shown for selectively allowing the light passing through the lens 32, aperture stop 34 and mirror aperture 38, to reach the film 42 positioned immediately behind the field-stop means 44.

Since it is desirable that all of the light passing through the aperture stop 34 be allowed to reach the film 42 without interference, the shape of the aperture 38 in the mirror 36 will be determined by the peripheral surface of the "exposure cone" which is defined at one end by the diameter of the aperture stop 34, and at the other end by the maximum diameter of the field-stop 44. No light must be allowed to reach the film 42 except that passing through the aperture stop 34, therefore, shroud means 46 is provided between the aperture stop opening 34 and the aperture 38 in the mirror 36. This conically shaped shroud 46 preferably has a nonreflective outer surface so that no light is reflected therefrom to degrade the image on the view-finder.

The shroud 46 also provides a convenient means for supporting the aperture-stop means 34. As in the above-described embodiment, light passing through the lens means 32 outside the aperture stop 34, will intersect the reflective surface of the mirror 36 and be reflected upwards onto a ground glass view-finder plate 48.

In operation, the camera is aimed at the object 50 until a suitable composition of the image 50' is focused on the view-finder plate 48. The shutter 40 is then tripped to expose the film 42 with the image as shown at 50" for the proper interval of time. With the exception of the film-repositioning operation and any lens-focusing operation, no mechanical movement is required other than the shutter actuation.

Whereas the aperture stop 34 in this camera is shown as having a single setting, it is to be understood that it may likewise be adjustable. However, in order to achieve the best view-finding image and still not interfere with the light passing from the aperture stop to the film 42, the opening 38 and the mirror 36 must be appropriately matched to the largest aperture stop setting. Using such an arrangement, the stopping down of the aperture to a lower setting will have no effect on the image 50' reaching the view-finder plate 48, but will, as intended, merely restrict the amount of light which reaches the film 42.

It will likewise be apparent that since there is a rather large aperture 38 in the mirror 36, it would appear that a discontinuity in the image 50' would appear at the view-finder. This, however, has been found to be quite insignificant since the light reflected from other portions of the mirror diffuses so as to render the discontinuity of the image almost unnoticeable.

By providing a camera in accordance with the present invention, no distortion whatsoever of the photographic image is produced, and the diffusion which may or may not be noticeable at the view-finder, is relatively insignificant.

After having read the above disclosure, many alterations and modifications of the invention will become apparent to those of skill in the art, and it is to be understood that this description, in connection with particular preferred embodiments, is for purposes of illustration only and is in no manner intended to be limiting in any way. Accordingly, I intend that the appended claims are to be interpreted as covering all modifications which fall within the true spirit and scope of my invention.

What is claimed is:

1. A camera, comprising:
    a camera housing;
    window means and film-positioning means defining an optical axis, said window means being formed in a wall of said housing for allowing light to pass along said optical axis for exposing a photographic film positioned by said film-positioning means;
    fixed mirror means disposed along said optical axis, said mirror means being inclined at an angle relative to said optical axis and having a single aperture therein concentric with said optical axis and forming a fixed aperture stop, said mirror means having a reflective surface on the side facing said window means for reflecting light not passing through said aperture;
    a focusing lens means and an adjustable aperture stop disposed along said optical axis between said lens means and said mirror means, the minimum dimensions of said fixed aperture being determined by the maximum stop diameter of said adjustable aperture stop;
    shutter means disposed along said optical axis between said mirror means and said positioning means for exposing said film to light passing through said aperture; and
    view-finder means disposed opposite said reflective surface for receiving light reflected from said reflected surface and providing a continuous view of the image to which said film is to be exposed.

2. A camera as recited in claim 1 and further comprising a shroud means connecting said adjustable aperture stop and said aperture so as to prevent light passing outside of said aperture stop means from passing through said aperture.

3. In a camera for exposing a film-strip to a photographic image including, a camera housing having a window means for allowing light to enter said housing, a film-positioning means disposed along an optical axis passing through said window means, and shutter means disposed along said optical axis between said window means and said film-positioning means, the improvement comprising:
    a fixed mirror means disposed between said window means and said shutter means, said mirror means being inclined at an angle relative to said optical axis and having a single light transmissive aperture therein disposed concentric with said optical axis and forming a fixed aperture stop, said mirror means having a reflective surface on the side facing said window means for reflecting light not passing through said aperture;
    a focusing lens means and an adjustable aperture stop serially disposed along said optical axis between said window means and said mirror means, the minimum dimensions of said aperture being determined by the maximum stop diameter of said adjustable aperture stop; and
    view-finder means disposed relative to said reflective surface for receiving light reflected therefrom and continuously displaying said photographic image.

4. In a camera as recited in claim 3 and further comprising a shroud means connecting said adjustable aperture stop and said aperture so as to prevent light passing outside of said adjustable aperture stop from passing through said aperture.

5. A camera, comprising:
    a camera housing;
    window means including a focusing lens means, and film-positioning means defining an optical axis, said window means being formed in a wall of said housing for allowing viewing light and film-exposing light to enter said housing;
    fixed mirror means disposed along said optical axis and having a reflective surface on the side facing said window means for reflecting said viewing light, said mirror means being inclined at an angle relative to said optical axis and having a single aperture therein concentric with said optical axis and forming a fixed aperture stop for allowing said film-exposing light to pass therethrough;
    an additional aperture stop disposed along said optical axis between said lens means and said mirror means and cooperating with said fixed aperture stop to define an exposure cone of said exposing light;

shutter means disposed along said optical axis for selectively exposing the photographic film to said film exposing light; and view finder means disposed opposite said reflective surface for receiving the reflected viewing light and providing a continuous view of the image to which said film is to be exposed.

6. In a camera for exposing a photographic film to an image of a photographic object and including, a camera housing having a window means for allowing light to enter said housing, a film-positioning means disposed along an optical axis passing through said window means, and shutter means disposed along said optical axis between said window means and said film-positioning means, the improvement comprising:

a fixed mirror means disposed between said window means and said shutter means, said mirror means being inclined at an angle relative to said optical axis and having a single light transmissive aperture therein disposed concentric with said optical axis and forming a fixed aperture stop, said mirror means having a reflective surface on the side facing said window means for reflecting light not passing through said aperture;

an additional aperture stop disposed along said optical axis between said window means and said mirror means and cooperating with said single fixed aperture stop to define an exposure cone of film-exposing light; and view-finder means disposed relative to said reflective surface for receiving light reflected thereby and continuously displaying said image.

* * * * *